July 21, 1936.  J. DOLAN ET AL  2,048,665
BEVERAGE COOLING AND DISPENSING SYSTEM
Filed Dec. 5, 1935   3 Sheets-Sheet 3
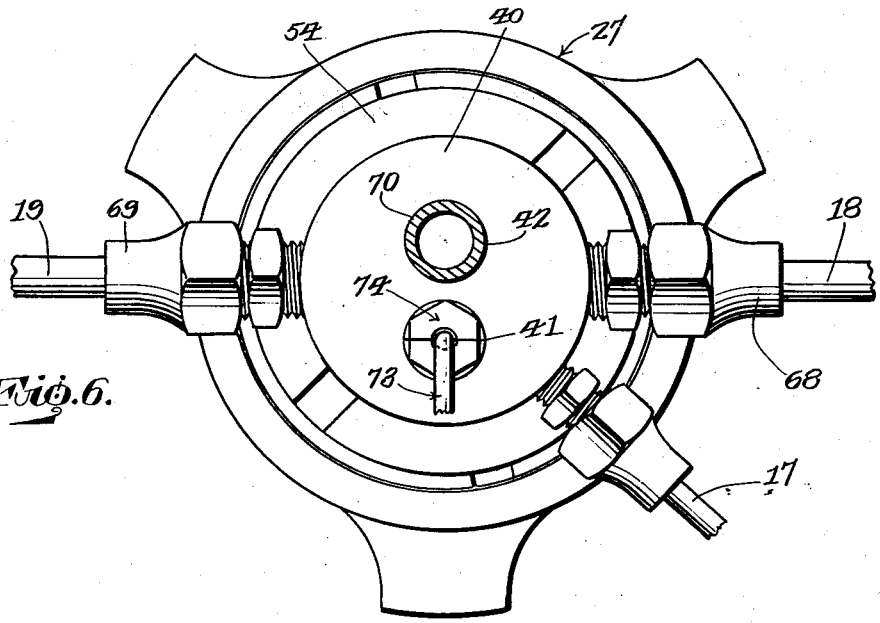
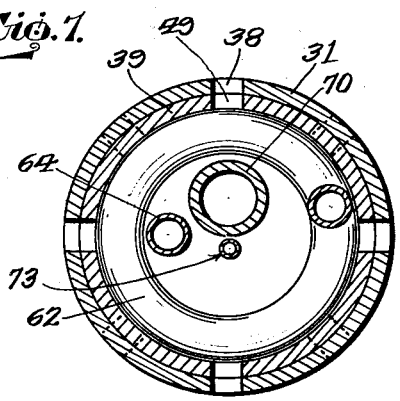
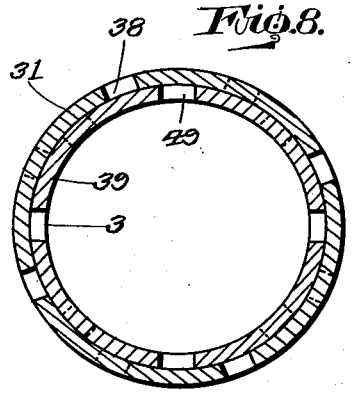
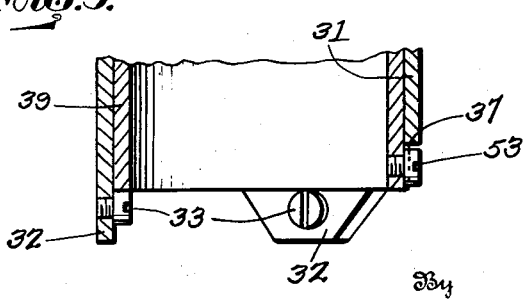
Inventor
John Dolan
Anthony J. Granata
By Geo. P. Kimmel
Attorney Patented July 21, 1936

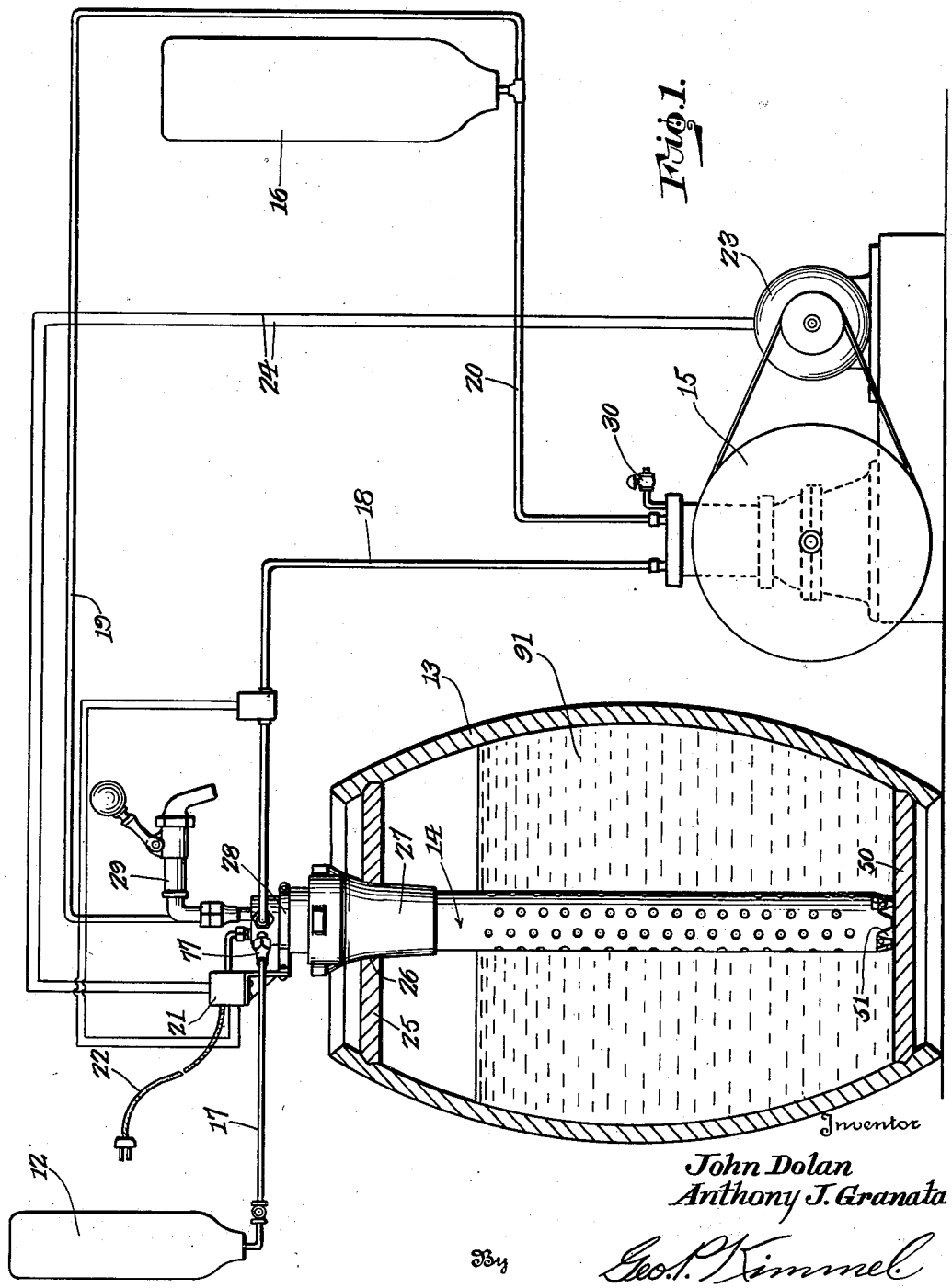

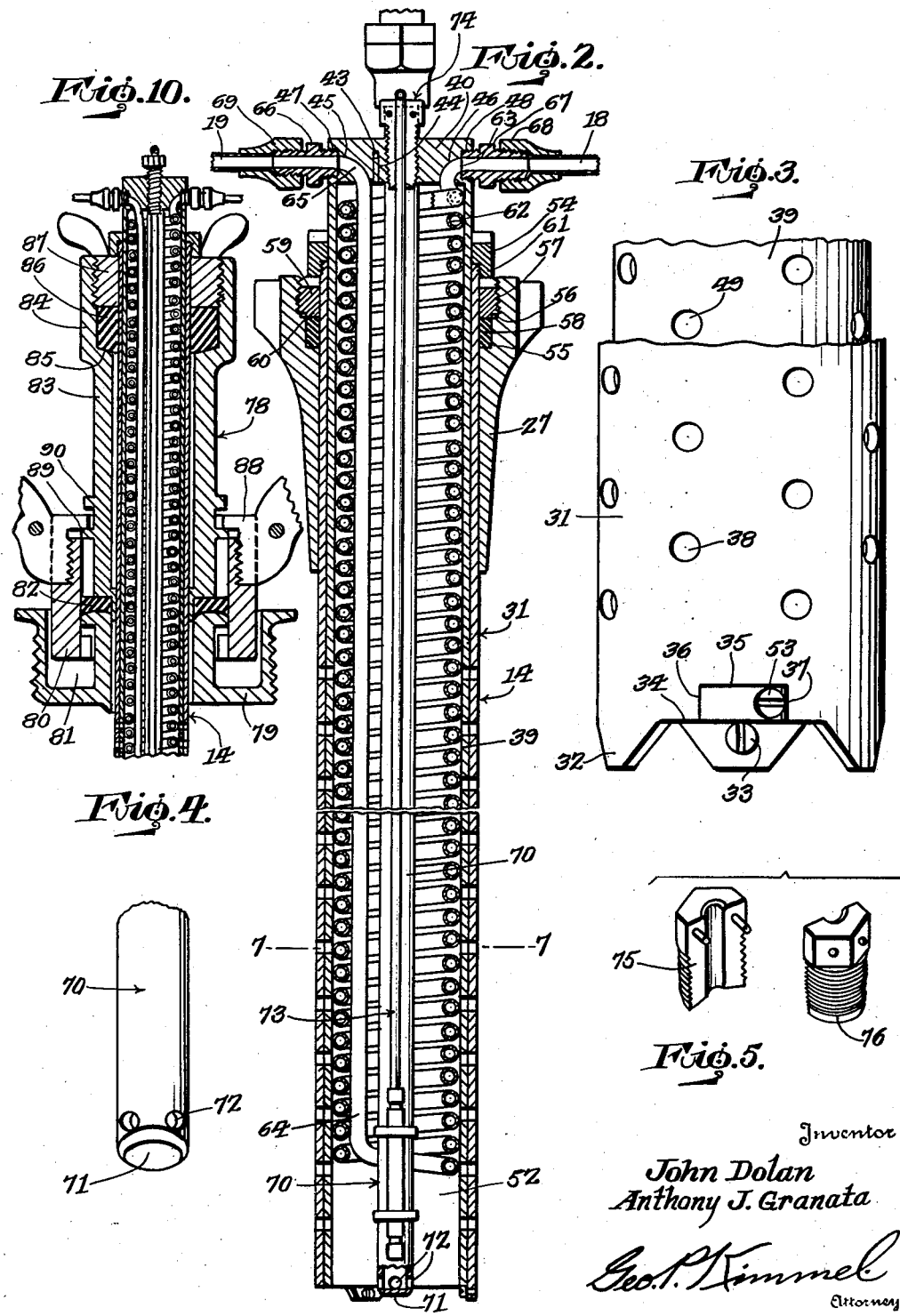

2,048,665

UNITED STATES PATENT OFFICE 2,048,665

BEVERAGE COOLING AND DISPENSING SYSTEM

John Dolan, Fords, and Anthony J. Granata, Trenton, N. J., assignors of thirty per cent to said Dolan, forty-seven and one-half per cent to said Granata, ten per cent to Alfred D. Antonio, Perth Amboy, three per cent to Joseph Henry Volkmann, Union City, N. J., five per cent to Leo Savoleo, New York, N. Y., one and one-half per cent to Maggie E. Dilts, Whitehouse, and one and one-half per cent to Lucia Avidano and one and one-half per cent to Victor Bassi, both of Bridgewater, N. J.

Application December 5, 1935, Serial No. 53,070

10 Claims. (Cl. 225—1)

This invention relates to a beverage cooling and dispensing system, more particularly to a combined beverage cooling and dispensing unit forming an element of the system.

The invention aims to provide, in a manner as hereinafter set forth, a system of the class referred to including a combined beverage cooling and dispensing unit for mounting in, supported by and for extension from a beverage container and functioning to cool and to maintain the beverage being dispensed therefrom at a uniform temperature.

A further object of the invention is to provide, in a manner as hereinafter set forth, a system of the class referred to including a combined beverage cooling and dispensing unit for mounting in and extending from a beverage container and with the unit having means to provide for the circulation of the beverage therethrough when the unit is mounted in active position.

A further object of the invention is to provide, in a manner as hereinafter set forth, a system of the class referred to including a controllable combined beverage cooling and dispensing unit.

A further object of the invention is to provide, in a manner as hereinafter set forth, a system of the class referred to including a controllable combined beverage cooling and dispensing unit for bodily insertion into a beverage container and with the unit so formed to enable it to be thoroughly and conveniently cleaned when occasion requires.

A further object of the invention is to provide, in a manner as hereinafter set forth, a system of the class referred to including new and improved means capable of being operated from an economical standpoint for properly cooling the beverage and to prevent the beverage from becoming flat.

A further object of the invention is to provide, in a manner as hereinafter set forth, a system of the class referred to including means to provide, at an economical cost, for super-cooling properly the quantity of the beverage desired at intervals.

A further object of the invention is to provide, in a manner as hereinafter set forth, a system of the class referred to including a combined beverage cooling and dispensing unit for properly cooling the beverage without the employment of cooling coils forming inherent parts of a beverage dispensing line.

A further object of the invention is to provide, in a manner as hereinafter set forth, a system of the class referred to including a combined beverage cooling and dispensing unit for insertion into a beverage container and provided, when active, not only for cooling the beverage to the desired temperature, but also maintaining the quality of the beverage.

Further objects of the invention are to provide, in a manner as hereinafter set forth, a system for the purpose referred to which is simple in its construction and arrangement, strong, durable, sanitary, thoroughly efficient in its use, operated at an economical cost, readily assembled, and conveniently connected to and removed from the beverage container.

With the foregoing and other objects which may hereinafter appear, the invention consists of the novel construction, combination and arrangement of parts as will be more specifically referred to and as illustrated in the accompanying drawings wherein is shown an embodiment of the invention, but it is to be understood that changes, variations and modifications may be resorted to which fall within the scope of the invention as claimed.

In the drawings:

Figure 1 is an elevation of the system in accordance with this invention showing the adaptation thereof relative to a beverage container in vertical section, Figure 2 is a vertical sectional view of the combined beverage cooling and dispensing unit extending through a tap, Figure 3 is a framentary view upon an enlarged scale of the lower portion of the combined beverage cooling and dispensing unit, Figure 4 is a fragmentary view in elevation of the cooled beverage dispensing means, Figure 5 is a disassembled view in perspective of the thermostat coupling means, Figure 6 is a sectional plan of the combined beverage cooling and dispensing unit connected to a tap, Figure 7 is a section on line 7—7, Figure 2, Figure 8 is a sectional plan of the perforated tubular members of the combined beverage cooling and dispensing unit showing the perforations thereof in non-registry, Figure 9 is a fragmentary view in vertical section of the lower portions of the tubular members of the combined beverage cooling and dispensing unit, and Figure 10 is a vertical sectional view of a modified form of tap arranged relatively to a fragmentary portion in a vertical section of the combined beverage cooling and dispensing unit.

With reference to Figure 1, the system illustrated thereby includes an air supply means 12, a beverage container 13, a combined beverage cooling and dispensing unit 14 depending in and extended from the top of container 13, a compressor 15, a refrigerant storage tank 16, an air supply line 17 leading from the means 12 to the unit 14, a refrigerant supply line 18 leading from the compressor 15 to the unit 14, a refrigerant return line 19 leading from the unit 14 to the tank 16, a connecting line 20 between the tank 16 and the compressor 15, an electric thermostat control 21 having a plug and extension 22, an electric motor 23 for operating the compressor 15, and circuit lines 24 leading from control 21 to the motor 23. The top of the container 13 is indicated at 25 and formed with an opening 26 for the passage of a tap 27. The control 21 is supported from the upper end of the unit 14 by the means indicated at 28. The upper end of the unit 14 has detachably connected therewith a dispensing faucet 29. The compressor 15 is shown as provided with a pressure safety valve 30.

The unit 14 includes a revoluble outer tubular member 31 cut away at its lower end to form a plurality of spaced legs 32, each having its inner face provided with an inwardly extending stop or support 33, which by way of example, is illustrated as a screw. The cutting away of the lower portion of the member 31 provides high lower edge portions 34 between the upper ends of the legs 32. The member 31 is formed with a rectangular notch 35 which opens into one of the high edge portions 34. The end walls 36, 37 of the notch 35 constitute stops for arresting the revolving movement of the member 31 in opposite directions. The member 31 is open at each end and formed throughout with spaced openings 38 and it is arranged in encompassing relation with a stationary vertically disposed inner tubular member 39. The inner face of member 31 has a snug sliding fit with the outer face of member 39. The latter is of greater length than and extends upwardly from the upper end of member 31. The lower end of member 39 is mounted on the supports 33 whereby the lower end of member 39 is arranged above the lower end of member 31.

The member 39 is open at its lower end and has its upper end closed by a cap 40 extending above said upper end. Cap 40 has a vertical opening 41, a vertical opening 42, a diametrically disposed passage 43, a vertical port 44 opening at its upper end into the inner end of the channel 43 and at its lower end at the lower face of the plug 40, and curved passages 45, 46 communicating with threaded sockets 47, 48, respectively, opening at the edge thereof. Passages 45, 46 also open at the lower face of the plug 40. The member 39 is provided throughout with spaced openings 49 adapted to register with the openings 38 in the tubular member 31. When the unit 14 is extended into the container 13, the legs 32 of member 31 seat on the upper face of the bottom 50 of the container 13 and the lower end of member 39 is arranged above bottom 50. The providing of the member 31 with the legs 32 forms openings 51 for the passage of the beverage into a cooling chamber 52 formed by the member 39. When the openings 38 and 49 are in registration, they provide for the circulation of the beverage through the cooling chamber 52. The stops provided by the end walls 36, 37 of the notch 35 in connection with a stop 53 carried by the member 39 arrest the revolving movement of the member 31 in opposite directions relative to the member 39. The stop 53 is secured to the lower end of member 39 and extends into the notch 35 in the path of the end walls 36, 37 of said notch 35.

The upper end of the member 31 has secured thereto a notched annulus 54 engageable by a suitable instrument for revolving member 31 relative to member 39. The outer face of member 31 opposes the inner face of cap 27, and the latter is formed at its upper portion with a pair of internal superposed shoulders 55, 56. The inner face of tap 27 is threaded as at 57. A packing ring 58 is mounted on shoulder 55. A peripherally threaded annulus 59 engages the threads 57 and has a reduced depending portion 60 which bears against the packing ring 58. The annulus 54 seats on the top edge of member 31 and has a depending portion 61 which opposes the nut 59.

The unit 14 includes a refrigerant conducting coil 62 which is arranged in the chamber 52 and snugly engages the inner face of member 39. The coil 62 extends from a point in close proximity to the upper end of member 39 to a point spaced from the lower end of member 39. The upper end of the coil 62 has a curved extension 63 arranged in the passage 46. The lower end of the coil 62 merges into a vertically disposed pipe or line 64 having a curved upper portion 65 arranged in the passage 45. Secured in the sockets 47, 48, respectively, are peripherally threaded flanged laterally disposed nipples 66, 67 which have the inner ends of their inner faces registering with the passages 45, 46, respectively. The nipples 66, 67 form continuations of the said curved upper end 65 and extension 63 respectively. Abutting against the outer end of nipple 67 and registering with the inner face of the latter is the line 18. Abutting against the outer end of the nipple 66 and having its inner face registering with the inner face of the latter is the line 19. The lines 18, 19 are connected to the nipples 67, 66 respectively by the coupling sleeves 68, 69. Positioned in the chamber 52 and extending from a point above and in close proximity to the bottom of the legs 32 to above the cap 40 is a beverage dispensing line or pipe 70 which passes through the opening 42.

The upper end of the line 70 has suitably connected therewith the dispensing faucet 29. The upper end of line 70 is open and its bottom closed as at 71. The line 70 in close proximity to its bottom 71 is formed with spaced beverage intake openings 72, each having a part arranged in chamber 52 and its remaining part arranged below an edge portion 34.

The unit 14 may have its action controlled by pressure or temperature and is illustrated, by way of example, as having as a part thereof an electrically controlled thermostatic element 73 of known form of the tube, bulb and sylphon type which communicates with the controlling means 21. The thermostat projects above the cap 40 and it is secured to the latter by a coupling plug 74 formed of a pair of peripherally threaded interengaging sections 75, 76 which extend through the opening 41 and have threaded engagement with the wall of the latter. The thermostat 73 is secured against and is disposed lengthwise of the line 70. The air supply line is coupled with the cap 40 as at 77 and communicated with the passage 43.

With reference to Figure 10, a modified form of tap is shown which is indicated at 78. The tap 78 includes a peripherally threaded chambered annulus 79 adapted to be secured in the bung hole of the top of the beverage container, a coupler 80 extending through the chamber 81 of the annulus 79 and detachably connects therewith, a packing 82 arranged within the coupler 80 and upon the annulus 79, a vertical sleeve 83 having a reduced lower portion encompassed by the packing 82 and formed with an interiorly threaded part 84 of enlarged inner diameter to provide a shoulder 85, a packing 86 seated upon shoulder 85, a wing nut 87 engaging the threads of the portion 84 for maintaining the packing 86 against shoulder 85 and a flanged winged nut 88 threadedly engaging with the coupler 80 and extending between spaced peripheral lugs 89, 90 on sleeve 83. The unit 14 extends through the tap 78.

The members 31, 39 are formed of any suitable non-corroding metallic material. The member 31 acts to cool the beverage 91 which surrounds it exteriorly. The beverage within the chamber 52 is cooled by the member 39, coil 62 and line 64. The beverage 91 is withdrawn from the lower portion of the body of the beverage through the passage of the beverage into line 70 through the ports or openings 72. The intake of the cooled beverage into the line 70 is had at a point above the lower face of the bottom 50 of the container 13. The beverage is not only cooled exteriorly of the unit but also interiorly of the latter. The thermostat 73 acts to make and break an electrical contact in the control box of the mechanism 21. Said mechanism includes a solenoid valve operated by the action of the control box when the liquid in the sylphon bulb expands through the tube to the control box. Due to this expansion suitable means in the control box trips an electric switch, and when the switch is closed, the solenoid valve opens the line to allow the refrigerant to pass through the conducting line.

The openings in the tubular members are moved out of registration when the unit and tap are bodily inserted through the bung hole of the beverage container to prevent the spurging of the beverage.

What we claim is:

1. In a beverage cooling and dispensing system, a combined beverage cooling and dispensing unit for insertion in a body of beverage, said unit being formed with an air intake and constituting a beverage cooling chamber formed of inner and outer concentrically arranged tubular members, each formed with spaced perforations and one being stationary and the other revoluble relative to the stationary one, said revoluble member, when shifted in one direction relative to the other member, bringing into registration the openings in said members to provide for the circulation of the beverage through the cooling chamber and when shifted in the other direction closing the openings in said members to prevent the spurging of the beverage when the unit is inserted, a refrigerant conducting coil arranged within the inner of said members and being formed with an intake and an outlet, said members being open at their lower ends, a dispensing line extending through said inner member and adapted to have a dispensing faucet connected to the outer end thereof, and said dispensing line having a closed inner end and a beverage intake positioned in proximity to the said closed inner end.

2. In a beverage cooling and dispensing system, a combined beverage cooling and dispensing unit for insertion in a body of beverage, said unit being formed with an air intake and constituting a beverage cooling chamber formed of inner and outer concentrically arranged tubular members, each formed with spaced perforations and one being stationary and the other revoluble relative to the stationary one, said revoluble member, when shifted in one direction relative to the other member, bringing into registration the openings in said members to provide for the circulation of the beverage through the cooling chamber and when shifted in the other direction closing the openings in said members to prevent the spurging of the beverage when the unit is inserted, a refrigerant conducting coil arranged within the inner of said members and being formed with an intake and an outlet, said members being open at their lower ends, a dispensing line extending through said inner member and adapted to have a dispensing faucet connected to the outer end thereof, said dispensing line having a closed inner end and a beverage intake positioned in proximity to the said closed inner end, said inner member being of greater length than and extending from the outer end of said outer member, a cap closing the outer end of said inner member, said dispensing line extending through said cap, and said air intake and said intake and outlet of said coil arranged in said cap.

3. In a beverage cooling and dispensing system, a combined beverage cooling and dispensing unit for insertion in a body of beverage, said unit being formed with an air intake and constituting a beverage cooling chamber formed of inner and outer concentrically arranged tubular members, each formed with spaced perforations and one being stationary and the other revoluble relative to the stationary one, said revoluble member, when shifted in one direction relative to the other member, bringing into registration the openings in said members to provide for the circulation of the beverage through the cooling chamber and when shifted in the other direction closing the openings in said members to prevent the spurging of the beverage when the unit is inserted, a refrigerant conducting coil arranged within the inner of said members and being formed with an intake and an outlet, said members being open at their lower ends, a dispensing line extending through said inner member and adapted to have a dispensing faucet connected to the outer end thereof, said dispensing line having a closed inner end and beverage intakes positioned in proximity to the said closed inner end, said outer member being formed at its lower end with spaced legs for seating on the bottom of the beverage container, and said members having coacting means for limiting the revolving movement of the revolving member in opposite directions.

4. In a beverage cooling and dispensing system, a combined beverage cooling and dispensing unit for insertion in a body of beverage, said unit being formed with an air intake and constituting a beverage cooling chamber formed of inner and outer concentrically arranged tubular members, each formed with spaced perforations and one being stationary and the other revoluble relative to the stationary one, said revoluble member, when shifted in one direction relative to the other member, bringing into registration the openings in said members to provide for the circulation of the beverage through the cooling chamber and when shifted in the other direction closing the openings in said members to prevent the spurging of the beverage when the unit is inserted, a refrigerant conducting coil arranged within the inner of said members and being formed with an intake and an outlet, said members being open at their lower ends, a cap for said inner member, a dispensing line extending through said cap and inner member and adapted to have a dispensing faucet connected to the outer end thereof, said dispensing line having a closed inner end and beverage intakes positioned in proximity to the said closed inner end, and a refrigerant flow controlling means anchored to said dispensing line and extending through said cap.

5. In a beverage cooling and dispensing system, a combined beverage cooling and dispensing unit adapted for extension through the top of a beverage container to seat upon the bottom of the latter, said unit including a pair of concentrically arranged tubular members, the inner one of said members providing a cooling chamber, said members having coacting means to provide for the circulation of the beverage through said chamber, said members being open at their bottom, said outer member formed with depending spaced legs for seating on the bottom of the container and extending below the lower end of the inner member, the spaces between said legs providing for the passage of the beverage into said chamber, a cap for closing the outer end of the inner section, said outer section provided with means at the lower end for supporting said inner section, air intake means for said chamber connected to said cap, a refrigerant conducting coil snugly engaging the wall of said chamber, means connected to said cap for circulating a refrigerant through said coil, a beverage dispensing line extending through the coil and said cap and adapted to have connected to its outer end a dispensing faucet, said line being closed at its lower end, and said line in proximity to its closed lower end being formed with intake ports for the beverage.

6. In a beverage cooling and dispensing system, a combined beverage cooling and dispensing unit adapted to extend through a wall of a container and to seat on the wall of the container opposite said other wall, said unit including means to provide a cooling chamber having intakes at its lower end, said means being apertured to provide for the circulation of the beverage through said chamber, means for closing the outer end of said chamber, means connected to said closing means for conducting a refrigerant through said chamber, a beverage dispensing line arranged within said chamber for extending outwardly through said closing means, and said beverage conducting line being closed at its lower end and formed with beverage intakes in proximity to said closed lower end.

7. In a beverage cooling and dispensing system, a combined beverage cooling and dispensing unit for extension into a beverage container, said unit including a pair of concentrically arranged tubular members forming a cooling chamber and formed with apertures for the circulation of the beverage through said chamber, one of said members being supported by the other, both of said members having an open lower end, the outer one of said members having means at its bottom for passage of the beverage into said chamber, a cap for closing the outer end of the inner of said members, a refrigerant conducting means attached to said cap and having a part thereof arranged in said chamber, and a beverage dispensing line surrounded by the said part, extending through said cap and having its bottom depending from the inner one of said members, said dispensing line adjacent its bottom being formed with beverage intakes.

8. In a beverage cooling and dispensing system, a combined beverage cooling and dispensing unit for extension into a beverage container, said unit including a pair of concentrically arranged tubular members forming a cooling chamber and formed with apertures for the circulation of the beverage through said chamber, one of said members being supported by the other, both of said members having an open lower end, the outer one of said members having means at its bottom for passage of the beverage into said chamber, a cap for closing the outer end of the inner of said members, a refrigerant conducting means attached to said cap and having a part thereof arranged in said chamber, a beverage dispensing line surrounded by the said part, extending through said cap and having its bottom depending from the inner one of said members, said dispensing line adjacent its bottom being formed with beverage intakes, and one of said tubular members being revoluble relative to the other for closing the apertures in said members.

9. In a beverage cooling and dispensing system, a combined beverage cooling and dispensing unit for extension into a beverage container, said unit including a pair of concentrically arranged tubular members forming a cooling chamber and formed with apertures for the circulation of the beverage through said chamber, one of said members being supported by the other, both of said members having an open lower end, the outer one of said members having means at its bottom for passage of the beverage into said chamber, a cap for closing the outer end of the inner of said members, a refrigerant conducting means attached to said cap and having a part thereof arranged in said chamber, a beverage dispensing line surrounded by the said part, extending through said cap and having its bottom depending from the inner one of said members, said dispensing line adjacent its bottom being formed with beverage intakes, one of said tubular members being revoluble relative to the other for closing the apertures in said members, and said members having coacting means at their lower ends for limiting the revolving movement of the revoluble member relative to the other member.

10. In a beverage cooling and dispensing system, a combined beverage cooling and dispensing unit for extension through the tap of a beverage container into the latter, said unit including a pair of concentrically arranged snugly fitting tubular members open at their lower ends and one revoluble relative to the other, said inner member being of greater length than said outer member, said outer member having means for supporting said inner member, said inner member forming a beverage cooling chamber, said members having coacting means to provide the circulation of the beverage through said chamber, said outer member having means at its lower end to provide for the passage of the beverage into said chamber, a cap for closing the outer end of the inner member, a beverage circulating means connected to said cap and including a depending coil snugly engaging the wall of said chamber, a beverage dispensing line having a closed lower end positioned in proximity to and above the lower edge of said outer member, said beverage dispensing line extending through said cap, air intake means opening into the said chamber and connected to the cap, and said beverage dispensing line provided in proximity to its closed lower end with a set of beverage intakes.

JOHN DOLAN.
ANTHONY J. GRANATA.